(12) United States Patent
Han et al.

(10) Patent No.: US 8,363,039 B2
(45) Date of Patent: Jan. 29, 2013

(54) LIQUID CRYSTAL DISPLAY

(75) Inventors: Sansoo Han, Seoul (KR); Nakjin Seong, Kyungbuk (KR); Kyuman Lee, Gumi-si (KR); Jaeseo Kim, Kyungbuk (KR); Chulhyun Hwang, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 579 days.

(21) Appl. No.: 12/638,898

(22) Filed: Dec. 15, 2009

(65) Prior Publication Data

US 2010/0265225 A1 Oct. 21, 2010

(30) Foreign Application Priority Data

Apr. 20, 2009 (KR) .................. 10-2009-0034184

(51) Int. Cl.
*G09G 3/038* (2006.01)
*G09G 5/00* (2006.01)
(52) U.S. Cl. ......................................... 345/206
(58) Field of Classification Search .................. 345/206, 345/213, 98, 102, 89; 377/64
See application file for complete search history.

(56) References Cited

U.S. PATENT DOCUMENTS

| | | | |
|---|---|---|---|
| 8,068,082 B2 * | 11/2011 | Cho et al. ................. | 345/98 |
| 8,107,586 B2 * | 1/2012 | Shin et al. ................ | 377/64 |
| 8,144,113 B2 * | 3/2012 | Park et al. ................ | 345/102 |
| 2010/0085348 A1 * | 4/2010 | Bae et al. ................. | 345/213 |
| 2010/0123653 A1 * | 5/2010 | Kwon et al. ............... | 345/89 |

* cited by examiner

*Primary Examiner* — Fred Tzeng
(74) *Attorney, Agent, or Firm* — Birch, Stewart, Kolasch & Birch, LLP

(57) ABSTRACT

A liquid crystal display is disclosed. The liquid crystal display includes a liquid crystal display panel including an upper substrate, a lower substrate, a liquid crystal layer between the upper substrate and the lower substrate, and m×n liquid crystal cells (where m and n are a positive integer) arranged in a matrix format according to a crossing structure of m/2 data lines and 2n gate lines, a plurality of chip on films (COFs) on which source driver integrated circuits (ICs) supplying a data voltage to the data lines are mounted, a printed circuit board (PCB) connected to input terminals of the COFs, and a gate drive circuit directly mounted onto the lower substrate, the gate drive circuit supplying a gate pulse to the gate lines.

4 Claims, 6 Drawing Sheets

LIQUID CRYSTAL DISPLAY

This application claims the benefit of Korea Patent Application No. 10-2009-0034184 filed on Apr. 20, 2009, the entire contents of which is incorporated herein by reference for all purposes as if fully set forth herein.

BACKGROUND OF THE INVENTION

1. Field of the Invention

Embodiments of the invention relate to a liquid crystal display.

2. Discussion of the Related Art

Active matrix type liquid crystal displays display a moving picture using a thin film transistor (TFT) as a switching element. The active matrix type liquid crystal displays have been implemented in televisions as well as display devices in portable devices, such as office equipment and computers, because of the thin profile of an active matrix type liquid crystal displays. Accordingly, cathode ray tubes (CRT) are being rapidly replaced by active matrix type liquid crystal displays.

A driving circuit of a liquid crystal display includes a data drive circuit supplying a data voltage to data lines of a liquid crystal display panel and a gate drive circuit supplying a gate pulse to gate lines of the liquid crystal display panel. Integrated circuits (ICs) of each of the data drive circuit and the gate drive circuit are connected to the data lines and the gate lines through a tape carrier package (TCP) technology or a chip on glass (COG) technology. Printed circuit boards (PCBs) of the liquid crystal display may be connected to the liquid crystal display panel through the TCP technology or may be connected to ICs bonded on a glass substrate of the liquid crystal display panel using a flexible printed circuit (FPC) through the COG technology. In a module assembly process of the liquid crystal display, the PCBs may be assembled in a flat structure parallel to the glass substrate of the liquid crystal display panel by the TCP or the FPC or may be assembled in a bent structure of the liquid crystal display panel.

However, the manufacturing cost of the related art liquid crystal display increases because of the use of the expensive ICs. Further, because a large number of ICs are required to drive the liquid crystal display and a large number of signal lines are formed on the PCB, the size of the PCB increases. Accordingly, the size of the PCB has to be reduced for the thin-profile liquid crystal display.

When the ICs are boned on the glass substrate of the liquid crystal display panel through the COG technology, defective orientation of liquid crystals may be generated. More specifically, in the COG technology, in a high temperature laminating process, the ICs are boned on the glass substrate using an anisotropic conductive film (ACF). Subsequently, when the ICs and the glass substrate are cooled at a normal temperature, a shrinkage amount of the ICs is different form a shrinkage amount of the glass substrate because a thermal expansion coefficient of the glass substrate is different form a thermal expansion coefficient of the ICs. As a result, the defective orientation of the liquid crystals is partially generated around a bonding surface between the ICs and the glass substrate.

SUMMARY OF THE INVENTION

Embodiments of the invention provide a liquid crystal display capable of reducing the size of a printed circuit board and preventing defective orientation of liquid crystals by reducing the number of integrated circuits.

In one aspect, there is a liquid crystal display comprising a liquid crystal display panel including an upper substrate, a lower substrate, a liquid crystal layer between the upper substrate and the lower substrate, and m×n liquid crystal cells (where m and n are a positive integer) arranged in a matrix format according to a crossing structure of m/2 data lines and 2n gate lines, a plurality of chip on films (COFs) on which source driver integrated circuits (ICs) supplying a data voltage to the data lines are mounted, a printed circuit board (PCB) connected to input terminals of the COFs, and a gate drive circuit directly mounted onto the lower substrate, the gate drive circuit supplying a gate pulse to the gate lines.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail embodiments of the invention examples of which are illustrated in the accompanying drawings.

Figure 1:
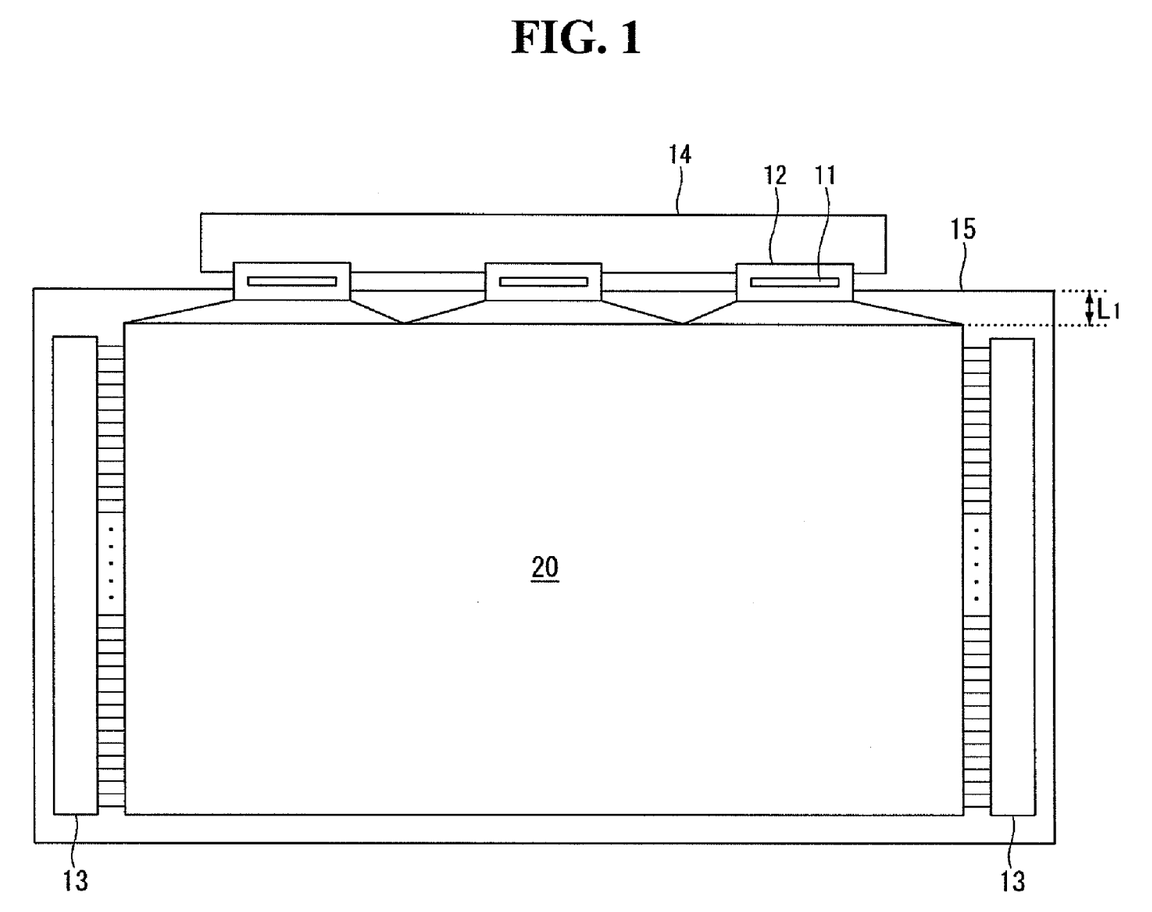
FIG. 1 is a block diagram illustrating a liquid crystal display according to an embodiment of the invention.
Figure 2:
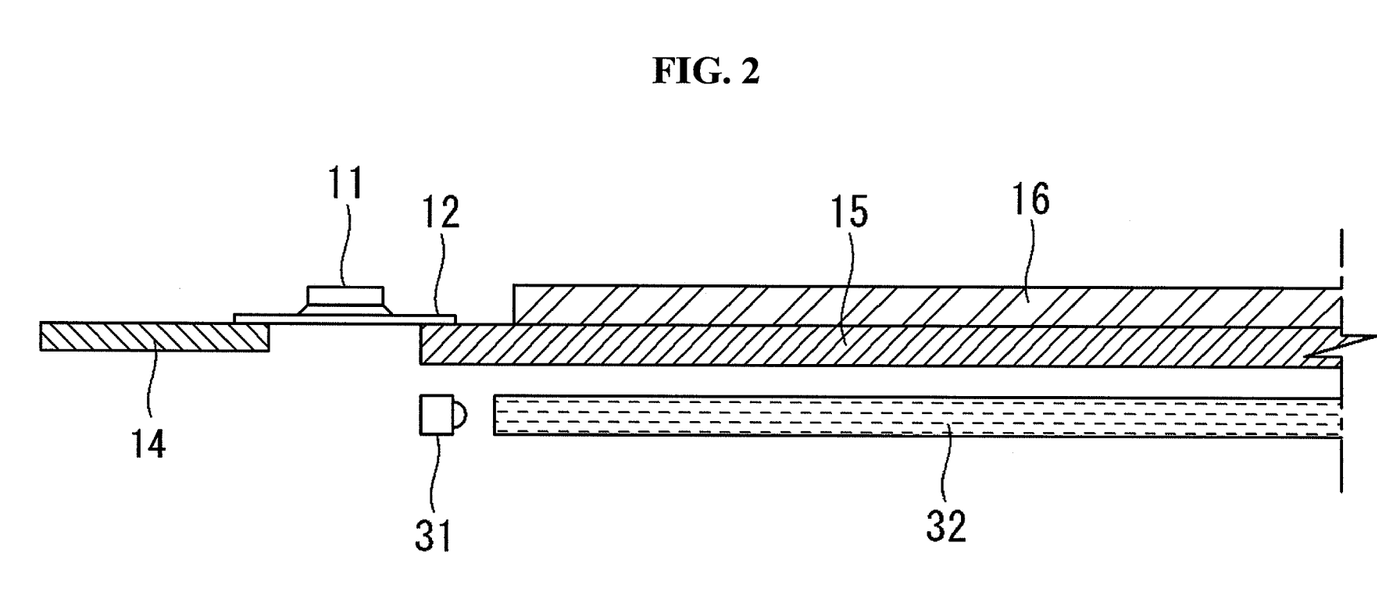
FIG. 2 is a cross-sectional view illustrating an example of assembling a liquid crystal display according to an embodiment of the invention to a flat type liquid crystal display module.
Figure 3:
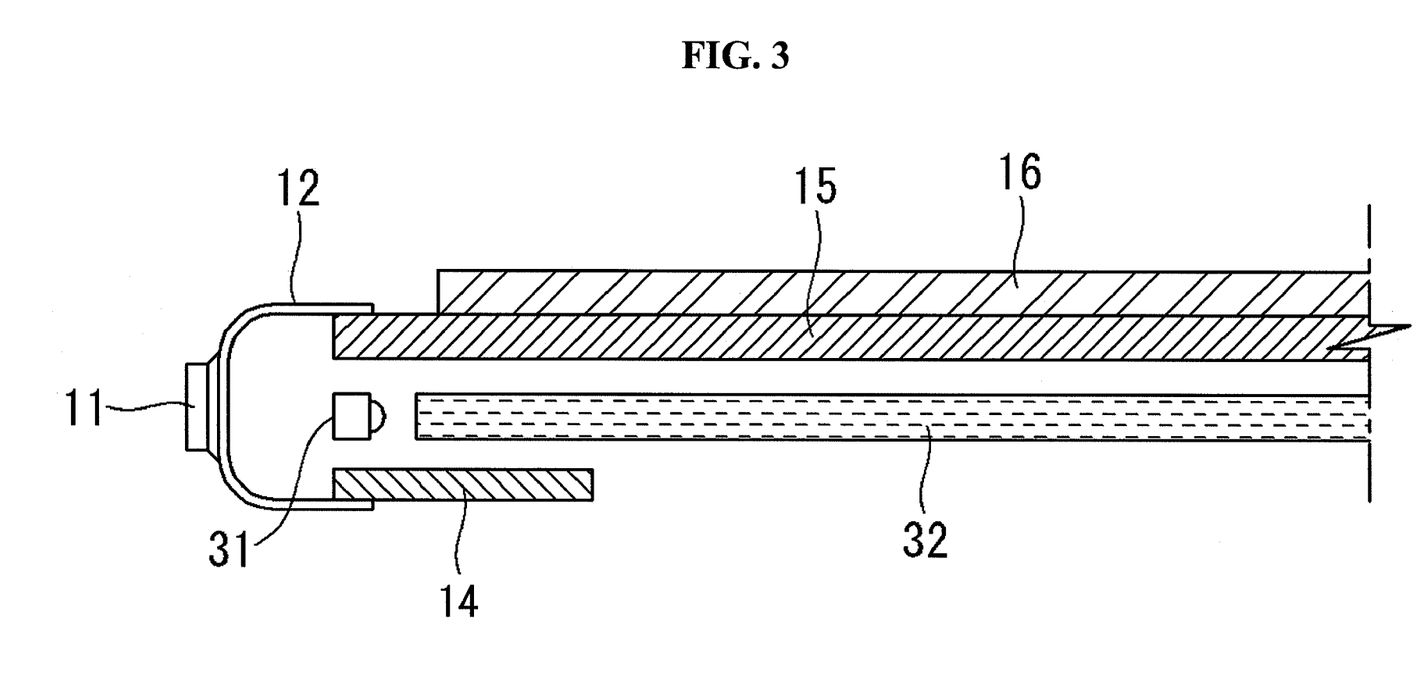
FIG. 3 is a cross-sectional view illustrating an example of assembling a liquid crystal display according to an embodiment of the invention to a bent type liquid crystal display module.

As shown in FIGS. 1 to 3, a liquid crystal display according to an embodiment of the invention includes a liquid crystal display panel, chip on films (COFs) 12 connected to data lines of the liquid crystal display panel, a gate drive circuit 13 directly mounted onto a lower glass substrate 15 of the liquid crystal display panel, a printed circuit board (PCB) 14 connected to the COFs 12, and the like.

The liquid crystal display panel includes an upper glass substrate 16 and the lower glass substrate 15 that are positioned opposite each other with a liquid crystal layer interposed between the upper glass substrate 16 and the lower glass substrate 15. The liquid crystal display panel includes a pixel array 20 displaying video data. The pixel array 20 includes m×n liquid crystal cells (where m and n are a positive integer) arranged in a matrix format according to a crossing structure of m/2 data lines and 2n gate lines. The m×n liquid crystal cells include m liquid crystal columns indicating liquid crystal cells arranged in a data line direction (or a vertical line direction) and n liquid crystal lines indicating liquid crystal cells arranged in a gate line direction (or a horizontal line direction).

The pixel array 20 including the m/2 data lines, the 2n gate lines, m×n pixel electrodes, m×n thin film transistors (TFTs) connected to the pixel electrodes, and m×n storage capacitors connected to the pixel electrodes is formed on the lower glass substrate 15 of the liquid crystal display panel. Each of the data lines is connected to TFTs of left liquid crystal columns and TFTs of right liquid crystal columns with each of the data lines interposed between the left liquid crystal columns and the right liquid crystal columns. The gate drive circuit 13 connected to the gate lines is directly formed on a non-display surface outside a formation portion of the pixel array 20 in the lower glass substrate 15. The pixel array 20 and the gate drive circuit 13 are simultaneously formed on the lower glass substrate 15 through the same thin film process. The liquid crystal cells are connected to the TFTs and are driven by an electric field between the pixel electrodes and a common electrode. A width L1 between the pixel array 20 and the COF 12 in the lower glass substrate 15 may be less than a width between the pixel array 20 and the COF 12 when source driver integrated circuits (ICs) are directly mounted onto the glass substrate through a chip-on glass (COG) process. A reduction amount of the width L1 may be equal to or greater than a thickness of the source driver ICs.

A black matrix, a color filter, and the common electrode are formed on the upper glass substrate 16 of the liquid crystal display panel. The common electrode is formed on the upper glass substrate 16 in a vertical electric drive manner, such as a twisted nematic (TN) mode and a vertical alignment (VA) mode. The common electrode and the pixel electrode 1 are formed on the lower glass substrate 15 in a horizontal electric drive manner, such as an in-plane switching (IPS) mode and a fringe field switching (FFS) mode.

Polarizing plates are respectively attached to the upper glass substrate 16 and the lower glass substrate 15 of the liquid crystal display panel. Alignment layers for setting a pre-tilt angle of liquid crystals are respectively formed on the upper glass substrate 16 and the lower glass substrate 15. Because the COG process is not used in the liquid crystal display panel according to the embodiment of the invention, defective orientation of the liquid crystals caused by the COG process can be prevented.

A liquid crystal mode of the liquid crystal display panel applicable to the embodiment of the invention may be implemented in any liquid crystal mode as well as the TN, VA, IPS, and FFS modes. The liquid crystal display according to the embodiment of the invention may be implemented in any type liquid crystal display including a backlit liquid crystal display, a transflective liquid crystal display, and a reflective liquid crystal display. A backlight unit is necessary in the backlit liquid crystal display and the transflective liquid crystal display. The backlight unit may be implemented as an edge type backlight unit or a direct type backlight unit. In the edge type backlight unit, as shown in FIGS. 2 and 3, a light source 31 is positioned opposite the side of a light guide plate 32, and a plurality of optical sheets (not shown) are positioned between the liquid crystal display panel and the light guide plate 32. In the direct type backlight unit, a plurality of optical sheets (not shown) and a diffusion plate (not shown) are stacked under the liquid crystal display panel, and a plurality of light sources (not shown) are positioned under the diffusion plate. The light source of the backlight unit may use one or at least two of a hot cathode fluorescent lamp (HCFL), a cold cathode fluorescent lamp (CCFL), an external electrode fluorescent lamp (EEFL), and a light emitting diode (LED).

The backlight unit of the liquid crystal display according to the embodiment of the invention may use the direct type backlight unit as well as the edge type backlight unit shown in FIGS. 2 and 3.

Each of the COFs 12 includes a source driver IC 11 mounted on a flexible film. Each of the source driver ICs 11 includes a data drive circuit for supplying a data voltage to the data lines of the liquid crystal display panel. The data drive circuit samples and latches digital video data serially input from the PCB 14 in response to a data timing control signal to convert the digital video data into parallel data. The data drive circuit converts the deserialized digital video data into a positive or negative analog video data voltage using an analog gamma compensation voltage. The data drive circuit time-divides a data voltage to be charged to left liquid crystal cells and a data voltage to be charged to right liquid crystal cells, the left liquid crystal cells and the right liquid crystal cells being arranged on the same liquid crystal line of the pixel array 20. Accordingly, the source driver ICs 11 may supply the data voltages to the data lines whose the total number is two times more than the total number of output channels of the source driver ICs 11.

The gate drive circuit 13 receives a gate timing control signal and a gate driving voltage through interconnections of a line on glass (LOG) and the COF 12 that are formed on the lower glass substrate 15. The gate drive circuit 13 includes a shift register sequentially shifting the gate driving voltage in response to the gate timing control signal to sequentially supply a gate pulse (or a scan pulse) to the gate lines.

The PCB 14 is connected to input terminals of the CPFs. A circuit, such as a DC-DC converter, a level shifter, and a timing controller, is mounted on the PCB 14. The DC-DC converter generates an analog voltage, such as the analog gamma compensation voltage and a common voltage supplied to the common electrode, supplied to the pixel array 20. The level shifter converts an input voltage level into a gate driving voltage level to supply the gate driving voltage level to the shift register of the gate drive circuit 13.

The timing controller receives RGB digital video data and timing signals, such as a vertical sync signal Vsync, a horizontal sync signal Hsync, a data enable signal DE, and a dot clock CLK, through an interface, such as a low voltage differential signaling (LVDS) interface and a transition minimized differential signaling (TMDS) interface. The timing controller serially transmits the RGB digital video data to the source driver ICs 11 in a mini LVDS interface manner. The timing controller generates a data timing control signal for controlling the source driver ICs 11 and a gate timing control signal for controlling the gate drive circuit 13 using the timing signals Vsync, Hsync, DE, and CLK. The timing controller may multiply a frequency of each of the data timing control signal and the gate timing control signal based on a frame frequency of (60×i) Hz (where "i" is a positive integer equal to or greater than 2), so that digital video data input at a frame frequency of 60 Hz can be reproduced in the pixel array 20 of the liquid crystal display panel at the frame frequency of (60×i) Hz.

The data timing control signal includes a source start pulse, a source sampling clock, a polarity control signal, a source output enable signal, and the like. The source start pulse controls a start time point of a data sampling operation of the data drive circuit. The source sampling clock controls a data sampling operation inside the data drive circuit based on a rising or falling edge. The polarity control signal controls a polarity of the data voltage output from the data drive circuit. The source output enable signal controls output timing of the data drive circuit.

The gate timing control signal includes a gate start pulse, a gate shift clock, a gate output enable signal, and the like. The gate start pulse controls timing of a first gate pulse. The gate shift clock is a clock for shifting the gate start pulse. The gate output enable signal controls output timing of the gate drive circuit 13.

In the embodiment, because m liquid crystal columns are driven using the m/2 data lines, the number of source driver ICs is reduced to one half of the number of source driver ICs in the related art. As a result, the size of the PCB can be reduced by a reduction in the number of source driver ICs. Further, in the embodiment, because the gate drive circuit 13 is directly mounted onto the lower glass substrate 15, a tape carrier package (TCP) and a gate PCB are not necessary.

FIG. 2 is a cross-sectional view illustrating an example of assembling the liquid crystal display according to the embodiment of the invention to a flat type liquid crystal display module.

As shown in FIG. 2, in a module assembly process, the lower glass substrate 15 of the liquid crystal display panel, the COF 12, and the PCB 14 are assembled in a flat structure. Accordingly, a thickness of a flat type liquid crystal display module shown in FIG. 2 may be smaller than a thickness of a bent type liquid crystal display module shown in FIG. 3, and a bezel area of the flat type liquid crystal display module may be wider than a bezel area of the bent type liquid crystal display module.

FIG. 3 is a cross-sectional view illustrating an example of assembling the liquid crystal display according to the embodiment of the invention to a bent type liquid crystal display module.

As shown in FIG. 3, in a module assembly process, the COF 12 is bent, so that the PCB 14 can be positioned around the bottom of the backlight unit. The backlight unit is positioned between the lower glass substrate 15 and the PCB 14. As above, the thickness of the bent type liquid crystal display module of FIG. 3 may be greater than the thickness of the flat type liquid crystal display module of FIG. 2, but the bezel area of the bent type liquid crystal display module of FIG. 3 may be smaller than the bezel area of the flat type liquid crystal display module of FIG. 2.

The embodiment may use a pixel array substrate extracted from the same mother glass in the assembly process of the flat type liquid crystal display module and the assembly process of the bent type liquid crystal display module. The plurality of pixel arrays 20 each having a predetermined size are simultaneously formed on the mother glass. When the source driver ICs 11 are connected to the liquid crystal display panel using the COFs 12, the width L1 between the pixel array 20 and each of the COF 12 in the lower glass substrate 15 can be reduced as described above. Further, the number of pixel arrays 20 formed on one mother glass can increase by a reduction in the width L1.

Figure 4:
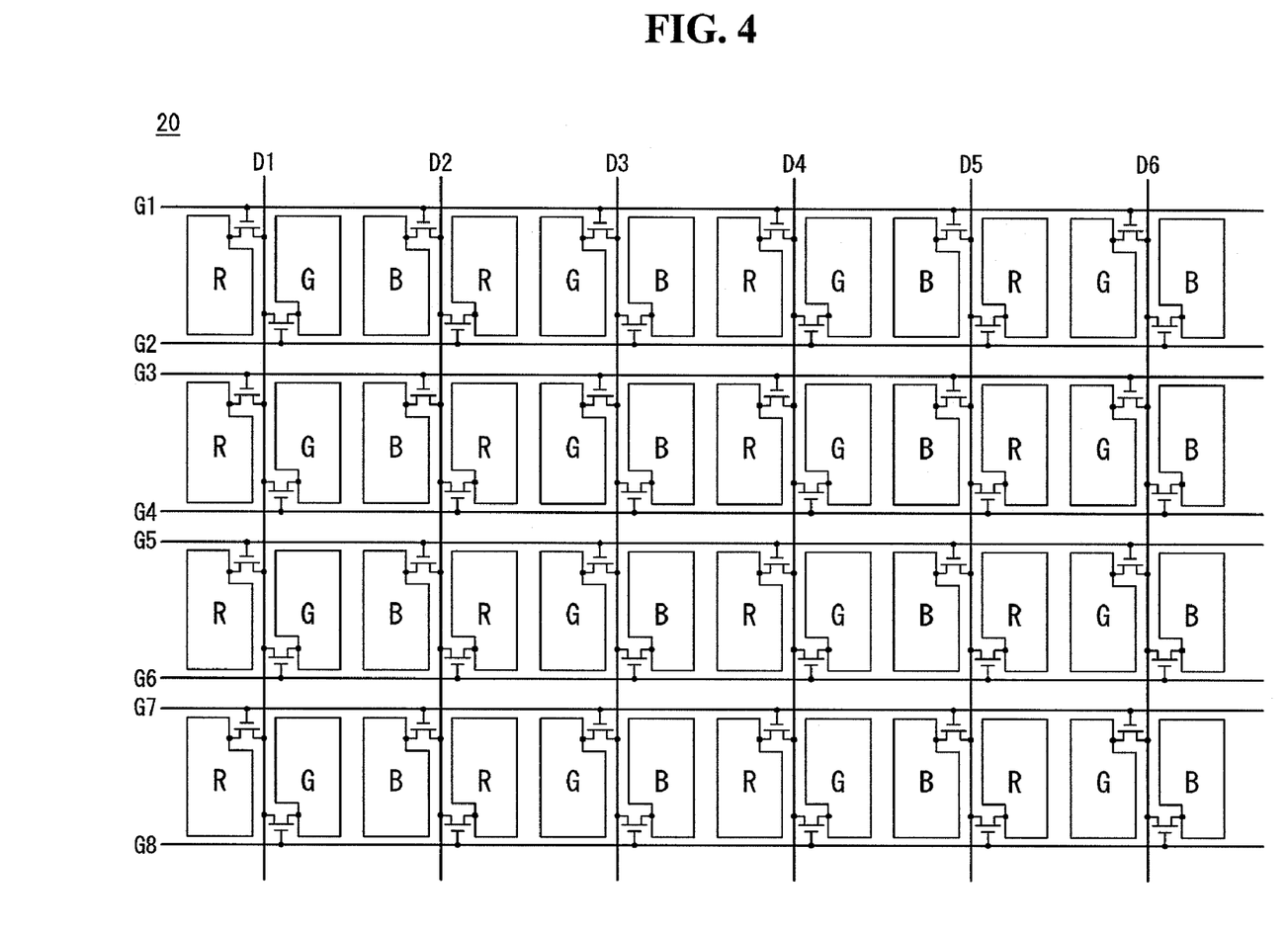
FIG. 4 is an equivalent circuit diagram illustrating a portion of a pixel array.
Figure 5:
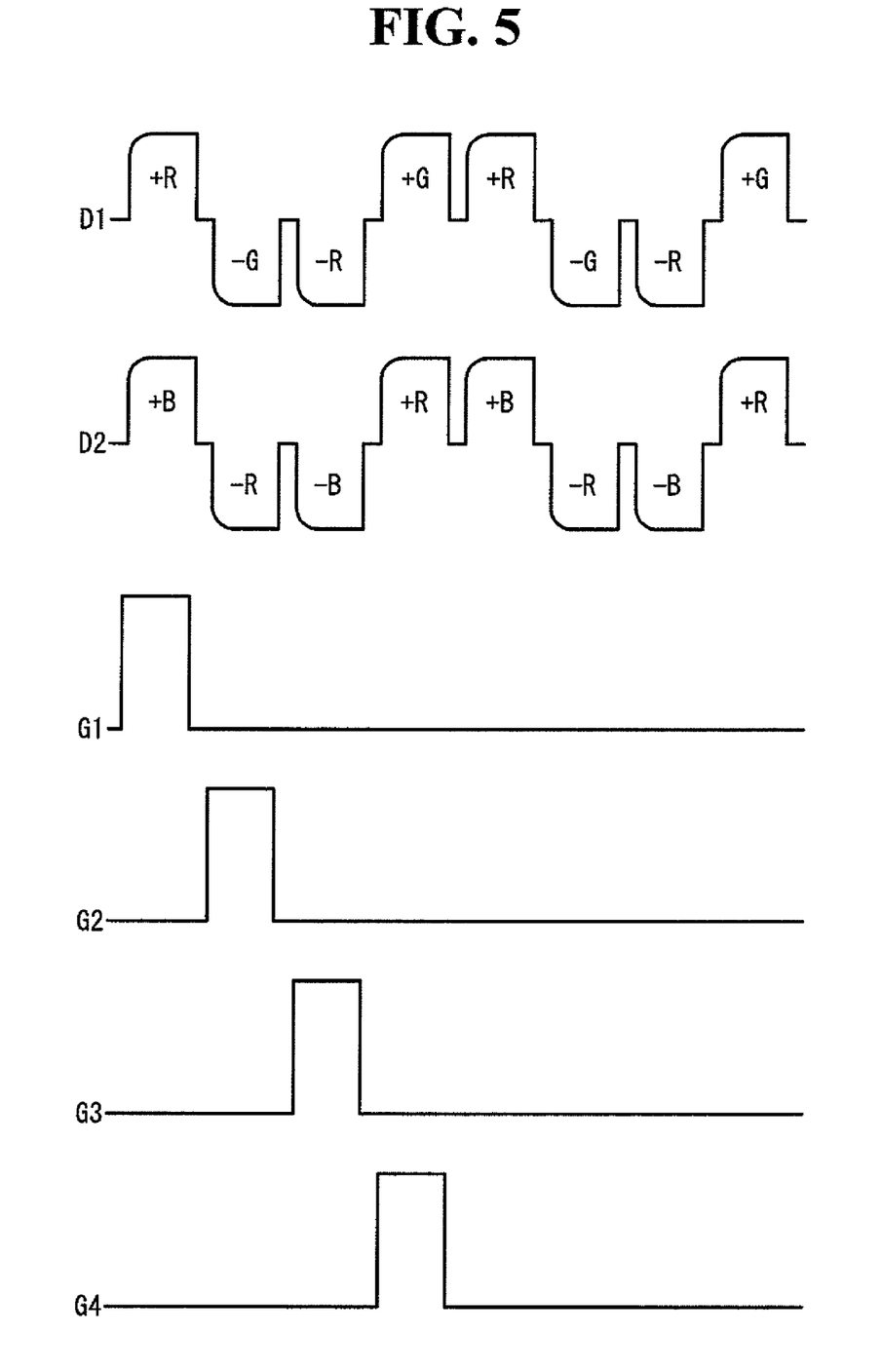
FIG. 5 is a waveform diagram illustrating an example of a data voltage and a gate pulse supplied to a pixel array.

FIG. 4 is an equivalent circuit diagram illustrating a portion of the pixel array 20 on the lower glass substrate 15. FIG. 5 is a waveform diagram illustrating an example of the data voltage and the gate pulse supplied to the pixel array 20.

As shown in FIGS. 4 and 5, liquid crystal columns between neighboring data lines D1 to D6 are positioned in two rows. Each of the data lines D1 to D6 is connected to TFTs of left liquid crystal columns and TFTs of right liquid crystal columns with each data line interposed between the left liquid crystal columns and the right liquid crystal columns. Gate lines G1 to G8 include odd-numbered gate lines G1, G3, G5 and G7 and even-numbered gate lines G2, G4, G6 and G8. In the same liquid crystal cell, the odd-numbered gate lines G1, G3, G5 and G7 are connected to TFTs of odd-numbered liquid crystal cells, and the even-numbered gate lines G2, G4, G6 and G8 are connected to TFTs of even-numbered liquid crystal cells. The TFTs include source electrodes connected to the data lines D1 to D6, gate electrodes connected to the gate lines G1 to G8, and drain electrodes connected to the pixel electrode. The data voltages time-divided by the source driver ICs 11 are supplied to the data lines D1 to D6 as shown in FIG. 5. The gate drive circuit 13 supplies an odd gate pulse synchronized with the data voltage charged to the odd-numbered liquid crystal cells to the odd-numbered gate lines G1, G3, G5 and G7 and supplies an even gate pulse synchronized with the data voltage charged to the even-numbered liquid crystal cells to the even-numbered gate lines G2, G4, G6 and G8.

Figure 6:
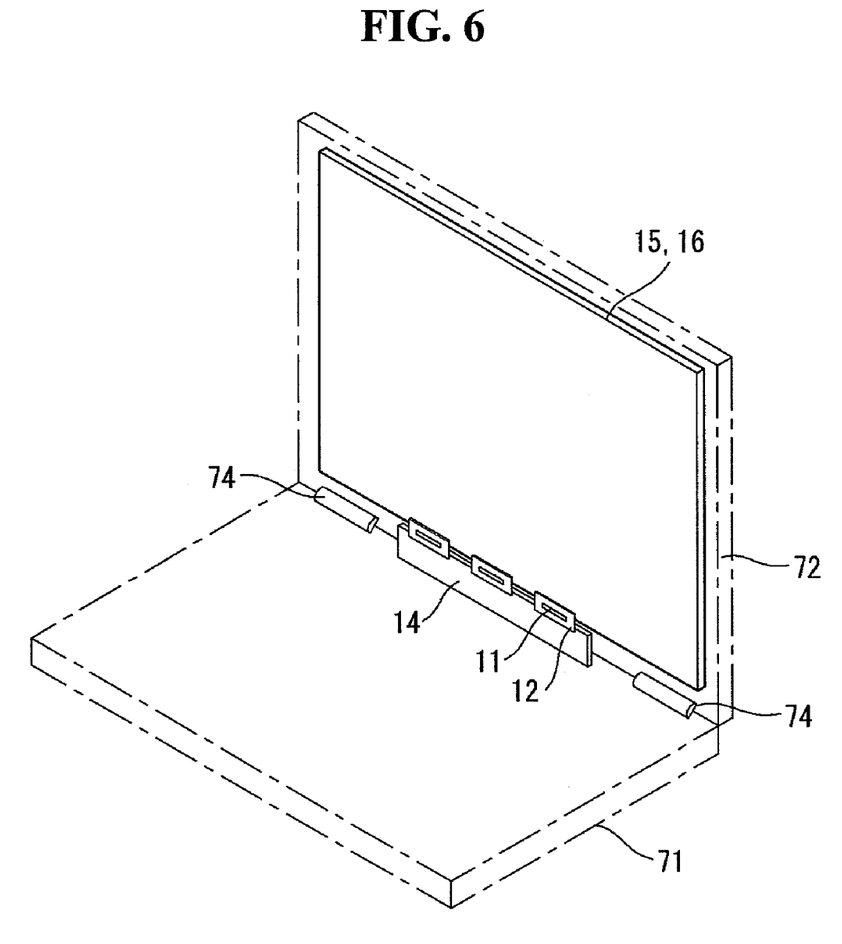
FIG. 6 is a perspective view illustrating an example of applying a flat type liquid crystal display module to a monitor of a notebook PC.

As described above, in the embodiment, the number of source driver ICs can decrease, and the number of interconnects on the PCB can decrease. As a result, the size of the CPB can be reduced. Accordingly, when the liquid crystal display according to the embodiment of the invention is applied to a monitor of a notebook PC, interference of the PCB 14 and a hinge 74 can be prevented even if the liquid crystal display is assembled to a flat type liquid crystal display module as shown in FIG. 6. In FIG. 6, a reference numeral 71 denotes a body of the notebook PC including a keypad and a main circuit board, and a reference numeral 72 denotes a body of the monitor rotatably fastened to the notebook PC body 71 using the hinge 74.

As describe above, in the liquid crystal display according to the embodiment of the invention, the source driver ICs whose the number of output channels is less than a horizontal resolution of the liquid crystal display panel are used, and the source driver ICs are connected to the liquid crystal display panel through the COF technology. Further, the gate drive circuit and the pixel array are directly formed onto the glass substrate of the liquid crystal display panel. As a result, the number of ICs required to drive the liquid crystal display panel can be reduced, the size of the PCB can be reduced, and the defective orientation of the liquid crystals can be prevented.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display comprising:
a liquid crystal display panel including an upper substrate, a lower substrate, a liquid crystal layer between the upper substrate and the lower substrate, and m×n liquid crystal cells (where m and n are a positive integer) arranged in a matrix format according to a crossing structure of m/2 data lines and 2n gate lines;
a plurality of chip on films (COFs) on which source driver integrated circuits (ICs) supplying a data voltage to the data lines are mounted;
a printed circuit board (PCB) connected to input terminals of the COFs; and
a gate drive circuit directly mounted onto the lower substrate, the gate drive circuit supplying a gate pulse to the gate lines, wherein each of the source driver ICs time-divides a data voltage to be charged to odd-numbered liquid crystal cells on the left of each of the data lines and a data voltage to be charged to even-numbered liquid crystal cells on the right of each of the data lines to supply the time-divided data voltages to the data lines, and wherein the odd-numbered liquid crystal cells and the even-numbered liquid crystal cells are adjacent to each other with the data line interposed between the odd-numbered liquid crystal cells and the even-numbered liquid crystal cells.

2. The liquid crystal display of claim 1, wherein the lower substrate of the liquid crystal display panel, the COFs, and the PCB are assembled in a flat structure.

3. The liquid crystal display of claim 1, wherein the COFs are bent so that the PCB is positioned in the rear of the liquid crystal display panel.

4. The liquid crystal display of claim 1, wherein the gate drive circuit supplies an odd gate pulse synchronized with the data voltage to be charged to the odd-numbered liquid crystal cells to odd-numbered gate lines and then supplies an even gate pulse synchronized with the data voltage to be charged to the even-numbered liquid crystal cells to even-numbered gate lines.

* * * * *